Patented July 8, 1952

2,602,728

UNITED STATES PATENT OFFICE 2,602,728

PREPARATION OF CHLOROPOLYSILANES

Warren L. Walton, Schenectady, N. Y., assignor to General Electric Company, a corporation of New York No Drawing. Application July 8, 1950, Serial No. 172,781

2 Claims. (Cl. 23—205)

This invention is concerned with the preparation of chloropolysilanes. More particularly, the invention relates to the preparation of chlorosilanes which comprises chlorinating an alloy of silicon whereby the chlorine together with silicon tetrachloride is passed through the silicon alloy maintained in a fluidized condition.

It has been known heretofore that chloropolysilanes can be prepared by the chlorination of silicon or its alloys using a static bed. However, under such circumstances using a static bed it has been found that the highest yield of chloropolysilanes containing more than two silicon atoms per molecule is about 13 per cent and that the weight of silicon in all the chlorides of more than two silicon atoms per molecule is rarely more than 21% of the weight of the silicon chlorinated.

I have now discovered that unexpectedly I am able to obtain greatly increased yields of chloropolysilanes containing more than two silicon atoms per molecule from the chlorination of silicon alloys than has heretofore been possible by the use of a static bed employed during the chlorination of the silicon alloys. More particularly, I have unexpectedly found that the use of a fluid bed comprising a silicon alloy is conducive for the preparation of chloropolysilanes containing more than two silicon atoms per molecule.

In accordance with my invention, I prepare a bed of finely divided silicon alloys, for example, calcium silicide, manganese-silicon alloys, iron-silicon alloys, etc., in a reactor suitable for fluidizing the charge of silicon alloy. Thereafter, I pass the chlorine preferably in the form of a gas through the silicon alloy bed in such a manner as to fluidize or agitate the finely divided powder comprising the bed.

In order to start the reaction, it is desirable to heat the alloy to a temperature of the order of about 190° to 250° C., while introducing the chlorine. Thereafter, the heat of reaction may be used to maintain the temperature high enough to cause the reaction to proceed. Whether or not heat need be applied after reaction has been initiated will then depend upon the rate at which heat is carried away by the escaping gases and by conduction through the walls of the apparatus. When losses by these routes are great enough, heat will be required from an outside source. For large batches it will generally be found that a cooling system will be desirable to remove the excessive heat of reaction and permit fast reaction at a controlled temperature, e. g., around 175° to 300° C.

While the chlorination may be conducted in the absence of any added diluent, I have found that I can advantageously dilute the chlorine with a silicon tetrahalide, for instance, silicon tetrachloride, to form a mixture comprising chlorine and silicon tetrachloride wherein the former comprises, for example, from about 1 to 15 mol percent and the latter comprises from about 85 to 99 mol percent. Higher or lower concentrations can, of course, be employed without departing from the scope of the invention. When using the SiCl$_4$ vapor with the chlorine, it has been found advantageous to fluidize the silicon alloy bed with the SiCl$_4$ vapor, and thereafter add the chlorine to the SiCl$_4$ and continue the fluidization by means of the mixture of the latter and the chlorine gas. The dilution of the chlorine with the SiCl$_4$ permits greatly enhanced control of the chlorination reaction.

All materials in the exit gases which are condensable at —78° C. are condensed and returned to the vessel from which SiCl$_4$ is boiled to supply fluidizing gas. As the chlorination proceeds in the case of the use of an alloy of silicon, for example, calcium silicide, the alloy is replaced by calcium chloride and chloropolysilanes are accumulated in the SiCl$_4$ boiler. When chlorination is complete as evidenced by the failure of the system to consume more chlorine and by the fact that the powder bed is almost white, the material in the SiCl$_4$ boiler is distilled to obtain the chloropolysilanes.

It was noted that the individual particles in the powder are either all black or all white, when using, for example, calcium silicide as a starting silicon alloy, and that the white particles dissolved completely in water leaving no dark residues. This would seem to indicate that the reaction was complete on an individual particle of the calcium silicide shortly after the reaction started so that either the reaction was exothermic enough to heat the particles to a temperature at which silicon would react, or individual particles practically never contained both silicon and calcium silicide.

In order that those skilled in the art may better understand how the present invention may be practiced, the following example is given by way of illustration and not by way of limitation. All parts are by weight.

EXAMPLE 1

Finely divided commercial calcium silicide alloy containing calcium equivalent to 72% CaSi$_2$ was placed in a reactor capable of being fluidized by means of a gas stream. The bed of calcium silicide was then heated at 200° C. and while it was being fluidized with SiCl₄ vapor, chlorine was mixed with the SiCl₄ vapor prior to agitation of the bed of calcium silicide in the mol ratio of about 3 to 8 mol percent chlorine and from 92 to 97 mol percent silicon tetrachloride. With the exception of Tests 4 and 5 in which the particle size of the calcium silicide was small enough to pass through a 60 mesh screen but too large to pass through a 100 mesh screen, all the other tests used calcium silicide alloys whose particle size was small enough to pass through a 100 mesh screen. In all cases the temperature (as indicated by a thermocouple enclosed in a glass wall which dipped into the fluidized solid powder in the reactor) at which the bed of calcium silicide was heated during passage of the chlorine and silicon tetrachloride was within the temperature range of from about 190° to 250° C. The following table shows the results of tests conducted using the conditions outlined above, as well as the additional conditions disclosed in the table.

*Table I*

| Sample No. | Parts Alloy | Time (Hrs.) | Parts Chlorine | Parts Spent Powder | Parts Si₂Cl₆ | Parts Chlorosilanes containing more than two Silicon Atoms | Parts Chlorosilanes containing more than two Silicon Atoms Calculated as Si₃Cl₈ |
|---|---|---|---|---|---|---|---|
| 1 | 70 | 9 | ¹ 73 | 48.0 | 30.0 | | 44.6 |
| 2 | 70 | 12 | ¹ 77 | 58.1 | 28.7 | | 41.5 |
| 3 | 50 | 18 | ¹ 76 | 40.3 | 26.7 | | 28.7 |
| 4 | 400 | 7 | ² 765 | 336.0 | 224 | 191 | |
| 5 | 400 | 7 | ² 754 | 342.0 | 206 | 241 | |

¹ Calculated from difference in weight of product less weight of initial alloy plus silicon tetrachloride.
² Actual input of chlorine.

In Sample No. 5 distillation of the reaction product indicated that about 45% of the product was Si₂Cl₆, 34% was Si₃Cl₈, 11% was Si₄Cl₁₀, 8% of the product were chloropolysilanes containing five and six silicon atoms, and about 2% residue.

Attempts to react chlorine with calcium silicide in a static bed under essentially similar temperature and particle size conditions gave much smaller yields of chloropolysilanes containing more than two silicon atoms per molecule than the yields of such longer chloropolysilanes obtained in accordance with my process. That such unexpected results were obtainable could in no way have been predicted knowing of the prior art in connection with the preparation of chloropolysilanes by the reaction of chlorine with a silicon alloy.

It will, of course, be apparent to those skilled in the art that instead of the calcium silicide employed, other alloys of silicon may be employed as, for example, silicon alloys of manganese, chromium, iron, nickel, etc. In addition, other temperature conditions or variations in the mol ratios of the chlorine and silicon tetrahalide, e. g., silicon tetrachloride, etc., may also be used without departing from the scope of the invention.

The chloropolysilanes prepared in accordance with my invention may be used for many purposes. One application comprises effecting reaction between chlorobenzene and a chloropolysilane to obtain phenylchlorosilanes, for instance phenyltrichlorosilane. In another instance it is possible to effect reaction between benzene and these chloropolysilanes to give phenylchlorosilanes. The hexachlorodisilane obtained as a result of the practice of my claimed process can be caused to react with benzene in accordance with the disclosures and teachings in my earlier filed application, Serial No. 111,088, filed August 18, 1949, and assigned to the same assignee as the present invention.

What I claim as new and desire to secure by Letters Patent of the United States is:

1. The process for preparing higher proportions of inorganic chloropolysilanes containing at least three silicon atoms, together with diminishing proportions of chloropolysilanes containing more than three silicon atoms, which process comprises passing chlorine intermixed with silicon tetrachloride, both in the vapor phase, in which the chlorine comprises from 3 to 8 mol percent and the silicon tetrachloride comprises from 92 to 97 mol percent of the total amount of the mixture of these two gases, through a fluidized bed of a finely divided silicon alloy maintained at a temperature from 190° to 250° C.

2. The process for preparing higher proportions of inorganic chloropolysilanes containing at least three silicon atoms, together with diminishing proportions of chloropolysilanes containing more than three silicon atoms, which process comprises passing chlorine intermixed with silicon tetrachloride, both in the vapor phase, in which the chlorine comprises from 3 to 8 mol percent and the silicon tetrachloride comprises from 92 to 97 mol percent of the total amount of the mixture of these two gases, through a fluidized bed of finely divided calcium silicide at a temperature from about 190° to 250° C.

WARREN L. WALTON.

REFERENCES CITED

The following references are of record in the file of this patent:

UNITED STATES PATENTS

| Number | Name | Date |
|---|---|---|
| 2,425,504 | Belchetz | Aug. 12, 1947 |

OTHER REFERENCES

Schumb, article in "Chemical Reviews," pages 589–590, vol. 31, No. 3, December 1942.

Kite, article in "Chemical Engineering," pages 112–115, December 1947.

Mellor, "Comp. Treat. on Inorg. and Theor. Chem.," vol. 6, pages 960–962, 1925, Longmans, Green & Co., N. Y.